US011440172B2

(12) United States Patent
Hansen et al.

(10) Patent No.: US 11,440,172 B2
(45) Date of Patent: Sep. 13, 2022

(54) ALIGNMENT TOOL FOR ALIGNING BORES IN STRUCTURAL MEMBERS

(71) Applicant: Vestas Wind Systems A/S, Aarhus (DK)

(72) Inventors: Jesper Hermann Hansen, Varde (DK); Jakob Anders Sørensen, Fredericia (DK); Jens Torborg, Arre (DK)

(73) Assignee: Vestas Wind Systems A/S, Aarhus N (DK)

( * ) Notice: Subject to any disclaimer, the term of this patent is extended or adjusted under 35 U.S.C. 154(b) by 198 days.

(21) Appl. No.: 16/473,390

(22) PCT Filed: Jan. 23, 2018

(86) PCT No.: PCT/DK2018/050011
§ 371 (c)(1),
(2) Date: Jun. 25, 2019

(87) PCT Pub. No.: WO2018/137741
PCT Pub. Date: Aug. 2, 2018

(65) Prior Publication Data
US 2019/0337130 A1    Nov. 7, 2019

(30) Foreign Application Priority Data
Jan. 25, 2017    (DK) .................... PA 2017 70049

(51) Int. Cl.
*B25B 27/16*    (2006.01)
*B25B 27/02*    (2006.01)
*F16L 1/10*    (2006.01)

(52) U.S. Cl.
CPC .............. *B25B 27/16* (2013.01); *B25B 27/02* (2013.01); *F16L 1/10* (2013.01)

(58) Field of Classification Search
CPC . B25B 27/16; B25B 27/02; F16L 1/10; B25C 27/02
(Continued)

(56) References Cited

U.S. PATENT DOCUMENTS

| 643,081 A | * | 2/1900 | Bullock | F16D 3/60 464/56 |
| 3,685,126 A | * | 8/1972 | Kane | B25D 1/16 29/271 |

(Continued)

FOREIGN PATENT DOCUMENTS

| CN | 203649891 U | 6/2014 |
| EP | 2960530 A1 | 12/2015 |

(Continued)

OTHER PUBLICATIONS

China National Intellectual Property Administration, 2nd Notification of Office Action in CN Application No. 201880006258.9, dated Nov. 20, 2020.

(Continued)

*Primary Examiner* — Lee D Wilson
*Assistant Examiner* — Robert F Neibaur
(74) *Attorney, Agent, or Firm* — Wood Herron & Evans LLP

(57) ABSTRACT

An alignment tool (1) for aligning a bore (13) extending through a first structural member (14) with a bore (19) extending through a second structural member (15) is disclosed. The alignment tool (1) comprises two shaft portions (2, 3) having a cylindrical or cylindrical like configuration. The second shaft portion (3) is arranged adjacent to the first shaft portion (2). A portion of the second surface forms a continuation of a portion of the first surface. A first bushing (8) is arranged along the first shaft portion (2) and substantially covering the first surface, and a second bushing (9) is (Continued)

arranged along the second shaft portion (3) and substantially covering the second surface. Mutual rotational movements are allowed between the first shaft portion (2) and the first bushing (8) and between the second shaft portion (3) and the second bushing (9).

11 Claims, 4 Drawing Sheets

(58) Field of Classification Search
USPC .......................................................... 33/645
See application file for complete search history.

(56) References Cited

U.S. PATENT DOCUMENTS

| | | | | |
|---|---|---|---|---|
| 3,895,735 A | * | 7/1975 | Clay | F16J 13/12 220/324 |
| 4,089,613 A | | 5/1978 | Babbitt, Jr. | |
| 5,513,547 A | * | 5/1996 | Lovelace | B23Q 3/186 81/484 |
| 5,590,474 A | * | 1/1997 | Lamb | G01B 5/25 33/645 |
| 5,799,408 A | * | 9/1998 | Sprayberry | B25B 27/16 33/645 |
| 6,171,195 B1 | | 1/2001 | Ferguson | |
| 6,405,424 B1 | * | 6/2002 | Ferguson | B25B 27/16 29/464 |
| 6,588,934 B2 | * | 7/2003 | Law | B32B 15/015 29/898.059 |
| 2004/0031164 A1 | | 2/2004 | Sevastian | |
| 2015/0078892 A1 | | 3/2015 | Lomas et al. | |
| 2016/0091294 A1 | * | 3/2016 | Scheibel | B23P 19/10 33/555.1 |

FOREIGN PATENT DOCUMENTS

| | | | |
|---|---|---|---|
| JP | H0852664 A | | 2/1996 |
| JP | 2007162904 A | * | 6/2007 |
| JP | 6035463 B2 | | 11/2016 |

OTHER PUBLICATIONS

China National Intellectual Property Administration, First Notification of Office Action in CN Application No. 201880006258.9, dated Jun. 18, 2020.
China National Intellectual Property Administration, 3rd Notification of Office Action in CN Application No. 201880006258.9, dated Apr. 16, 2021.
Danish Patent and Trademark Office, Search and Examination Report in PA 2017 70049, dated Jun. 21, 2017.
European Patent Office, International Search Report and Written Opinion in PCT Application No. PCT/DK2018/050011, dated Apr. 13, 2018.

\* cited by examiner

ALIGNMENT TOOL FOR ALIGNING BORES IN STRUCTURAL MEMBERS

FIELD OF THE INVENTION

The present invention relates to a tool for aligning a bore extending through a first structural member with a bore extending through a second structural member. The structural members could, e.g., be in the form of flanges to be joined together by means of bolts inserted in the bores.

BACKGROUND OF THE INVENTION

The assembly of some structural members requires that the structural members are suitably aligned with respect to each other. For instance, in the case that the structural members are in the form of or comprises flanges which need to be joined together by means of bolts, through-going bores arranged for receiving the bolts and extending through the flanges must be aligned relative to each other in order to allow bolts to be inserted into pairs of bores formed in the respective flanges.

Various methods and tools have previously been used in order to ensure proper alignment of structural members. U.S. Pat. No. 5,799,408 discloses one such tool having a first shaft and a second shaft, the second shaft having a diameter less than the first shaft. The second shaft extends from an end of the first shaft such that a peripheral portion of the second shaft is coextensive with a portion of an outer peripheral surface of the first shaft. The first shaft is disposable in a bore of a first structural member and rotatable therein. The second shaft is disposable in a bore of second structural member. Upon rotation of the first and second shafts the coextensive peripheral portion of the second shaft is rotated into engagement with the second structural member, thereby aligning the bore of the second structural member with the bore of the first structural member.

When the tool of U.S. Pat. No. 5,799,408 is rotated as described above, the shaft portions slide against the inner surfaces of the bores formed in the structural members, thereby creating a grinding effect which may potentially damage the inner surfaces of the bores and a possible coating layer or surface treatment applied to these surfaces. This is in particular a problem in the case that the structural members are large, because in this case the frictional forces occurring between the tool and the inner surfaces of the bores are relatively large.

DESCRIPTION OF THE INVENTION

It is an object of embodiments of the invention to provide an alignment tool for aligning a bore extending through a first structural member with a bore extending through a second structural member, which allows wear on inner surfaces of the bores to be reduced as compared to prior art alignment tools.

It is a further object of embodiments of the invention to provide an alignment tool for aligning a bore extending through a first structural member with a bore extending through a second structural member, which allows the risk of damage to inner surfaces of the bores to be reduced as compared to prior art alignment tools.

The invention provides an alignment tool for aligning a bore extending through a first structural member with a bore extending through a second structural member, the alignment tool comprising:

a first shaft portion having a cylindrical or cylindrical like configuration defining a first cylinder axis, a first diameter and a first surface, a second shaft portion having a cylindrical or cylindrical like configuration defining a second cylinder axis, a second diameter and a second surface, the second shaft portion being arranged adjacent to the first shaft portion along a direction defined by the first cylinder axis, the second cylinder axis extending in parallel to the first cylinder axis, the second diameter being smaller than the first diameter and a portion of the second surface forming a continuation of a portion of the first surface, a first bushing arranged along the first shaft portion and substantially covering the first surface, and a second bushing arranged along the second shaft portion and substantially covering the second surface, wherein mutual rotational movements are allowed between the first shaft portion and the first bushing and between the second shaft portion and the second bushing.

Thus, the alignment tool of the invention is for aligning bores extending through two respective structural members. The structural members may advantageously be or form part of elements which are to be joined together by means of bolts or other suitable fasteners which are to extend through the aligned bores. For instance, the structural members may be or comprise flanges, such as tower flanges for a wind turbine tower.

The alignment tool comprises a first shaft portion and a second shaft portion, each having a cylindrical or cylindrical like configuration. In the present context the term 'cylindrical' should be interpreted to mean a shape in which all points on a surface of the shape are arranged with the same distance to a linearly extending axis, which may be referred to as the cylinder axis. Thus, a cylinder defines a circular cross section perpendicularly to the cylinder axis, and this circular cross section is invariant along the cylinder axis.

In the present context the term 'cylindrical like' should be interpreted to mean a shape which is similar to a cylinder, in the sense that it defines an invariant or almost invariant cross section perpendicularly to a linearly extending axis, but this cross section is not necessarily circular.

The first shaft portion, thus, defines a first cylinder axis and the second shaft portion defines a second cylinder axis. Furthermore, the first shaft portion defines a first diameter and a first surface, and the second shaft portion defines a second diameter and a second surface. The first/second diameter is a typical dimension of the invariant cross section of the first/second shaft portion. The first/second surface is an outer surface defined by the cylindrical or cylindrical like shape of the respective shaft portion.

The second shaft portion is arranged adjacent to the first shaft portion along a direction defined by the first cylinder axis. Thus, the second shaft portion extends from an end surface of the first shaft portion.

The second cylinder axis extends in parallel to the first cylinder axis. Accordingly, the first cylinder axis and the second cylinder axis are not coaxial. Instead the second cylinder axis is displaced relative to the first cylinder axis, in a direction perpendicular to the first cylinder axis. Thus, the second shaft portion is positioned eccentrically relatively to the first shaft portion.

The second diameter is smaller than the first diameter and a portion of the second surface forms a continuation of a portion of the first surface. Accordingly, the second shaft portion is accommodated within the first diameter, i.e. no part of the second surface extends beyond the first surface along a direction perpendicular to the first cylinder axis. In the region where the second surface forms a continuation of the first surface, a smooth transition from the first shaft portion to the second shaft portion is provided. However, in other regions of the first and second surfaces, an abrupt and discontinuous transition between the first and second surfaces exists. Accordingly, when first shaft portion is arranged in a bore of a first structural member and the second shaft portion is arranged in a bore of a second structural member, the bores will be aligned if inner surfaces of the bores rest on the regions of the shaft portions where the second surface forms a continuation of the first surface upon a 360° rotation of the alignment tool about the first cylinder axis. However, when the inner surfaces of the bores rest on other regions of the shaft portions, the bores will not be aligned.

The alignment tool further comprises a first bushing and a second bushing. The first bushing is arranged along the first shaft portion and substantially covers the first surface. The second bushing is arranged along the second shaft portion and substantially covers the second surface. Accordingly, when the alignment tool is arranged with the first shaft portion positioned in a bore of a first structural member and the second shaft portion position in a bore of a second structural member, the first bushing is arranged between the first shaft portion and an inner surface of the bore of the first structural member, and the second bushing is arranged between the second shaft portion and an inner surface of the bore of the second structural member. Thereby the bushings form an interface between the alignment tool and the bores, and the first and second surfaces of the shaft portions will not be arranged in direct contact with the inner surfaces of the bores.

The bushings are mounted on the shaft portions in such a manner that mutual rotational movements are allowed between the first shaft portion and the first bushing, and between the second shaft portion and the second bushing. The alignment tool can thereby be rotated in the bores with the first and second bushings rolling on the first and second surfaces. The friction between the respective bushings hand the surfaces of the bores should be configured such that it is greater than the friction between the shaft portions and the respective bushings. Thus, the grinding effect on the surfaces of the bores is minimised, and damage to the surfaces can be avoided or considerably reduced.

The alignment tool of the invention may be operated in the following manner. When alignment of bores extending through a first structural member and a second structural member, respectively, is required, the alignment tool is mounted in the bores with the first shaft portion arranged in the bore extending through the first structural member and the second shaft portion arranged in the bore extending through the second structural member.

The alignment tool is then rotated about the first cylinder axis until the region where the second surface forms a continuation of the first surface abuts inner surfaces of the respective bores. Thereby the first and second shaft portions perform rotational movements relative to the bores. However, since mutual rotational movements are allowed between the shaft portions and the respective bushings, the first and second surfaces will slide along the bushings, but the bushings will remain substantially stationary relative to the bores. Thereby no grinding or abrasion occurs between the alignment tool and the inner surfaces of the bores, and wear on the inner surfaces of the bores is thereby reduced, minimising the risk of damage to the surfaces.

When the alignment tool has been rotated 360°, the bores have been aligned.

In the case that the structural members are in the form of annular flanges, each having a plurality of bores extending there through, the process described above may be repeated by progressively inserting bolts into aligned bores inserting the alignment tool into other bores distributed along a periphery of the flanges until all bores in the flanges are aligned. Alternatively, a number of alignment tools may be inserted simultaneously in bores distributed along the periphery of the flange. Once the flanges have been aligned, bolts may be inserted in the bores where no alignment tool is arranged. Subsequently, the alignment tools may be removed from the bores, and bolts may be inserted in the remaining bores.

It should be noted, that since the first and second bushings are separate members, the bushings may also be allowed to rotate relative to each other.

In an embodiment of the alignment tool according to the invention, the alignment tool is configured such that the outer diameter of the first bushing substantially corresponds to the size of the bore extending through the first structural member and such that the first diameter substantially corresponds to the inner diameter of the first bushing.

It is herewith achieved that the alignment tool fits snugly within the bore of the first structural member. Hereby the radial position of the alignment tool is substantially fixed in relation to the second structural component, and the alignment of the bores can be performed in an effective manner.

The first bushing and/or the second bushing may have a cylindrical shape. According to this embodiment, the surfaces of the bushings which face the inner surfaces of the bores has a rounded shape, thereby even further reducing the risk of damage to the surfaces of the bores.

The first bushing may have a diameter which is larger than a diameter of the second bushing. According to this embodiment, the diameters of the bushings are adapted to the diameters of the shaft portions, thereby reducing any wobble between the shaft portions and the bushings.

The alignment tool may further comprise a tool engaging portion arranged to engage a tool for rotating the alignment tool about the first cylinder axis. According to this embodiment, the rotation of the alignment tool described above is performed using a rotating tool which is arranged in engagement with the tool engaging portion. The rotating tool may be a manually driven tool, such as a wrench, a torque wrench, a screwdriver, or the like. Alternatively, the rotating tool may be driven by means of a motor, a hydraulic system or the like.

The tool engaging portion may be or form part of a head part of the alignment tool. The head part may, e.g., be in the form of a standard bolt head.

The second shaft portion may have a tapered shape along a direction defined by the second cylinder axis and in a region arranged opposite to the portion of the second surface which forms an extension of a portion of the first surface. Such a tapered shape allows for easier insertion of the alignment tool in the bores.

The first bushing and/or the second bushing may comprise a first bearing portion facing the first structural member or the second structural member, respectively, the first bearing portion being composed of a copper-lead alloy, a plastic, a babbitt alloy or a bronze alloy suitable for a journal bearing.

According to this embodiment, the part of the first and/or second bushing which comes into contact with an inner surface of a bore is made from a material which has a low friction, and which is therefore suitable for a journal bearing. Furthermore, a bearing is formed between the bushings and the bores. This even further reduces the risk of wear and/or damage to the inner surfaces of the bores.

Alternatively or additionally, the alignment tool may further comprise at least one bearing, wherein the at least one bearing is arranged between the first shaft portion and the first bushing and/or between the second shaft portion and the second bushing.

According to this embodiment, a bearing is formed between at least one of the shaft portions and the corresponding bushing. Thereby the friction introduced between the shaft portion and the bushing during the rotational movement described above is reduced. Thereby the required torque to be applied to the alignment tool in order to perform the rotation can be reduced, and the wear on the shaft portions and the bushings can be reduced.

The bearing may be selected among journal bearings, ball bearings or roller bearings. Alternatively, any other suitable kind of bearing may be applied.

As an alternative, the first bushing and/or the second bushing may comprise a second bearing portion facing the first shaft portion or the second shaft portion, respectively, the second bearing portion being composed of a copper-lead alloy, a plastic, a babbitt alloy or a bronze alloy suitable for a journal bearing.

According to this embodiment, the part of the first/second bushing which comes into contact with the first/second shaft portion is made from a material which has a low friction, and which is therefore suitable for a journal bearing. Furthermore, a bearing is formed between at least one of the shaft portions and the corresponding bushings, and thereby the advantages described above are obtained.

Alternatively or additionally, the first shaft portion and/or the second shaft portion may comprise a third bearing portion facing the first bushing or the second bushing, respectively, the third bearing portion being composed of a copper-lead alloy, a plastic, a babbitt alloy or a bronze alloy suitable for a journal bearing. This is similar to the embodiment described above. However, in this case the bearing portion is formed on at least one of the shaft portions rather than on at least one of the bushings. It is not ruled out that bearing portions could be arranged on a shaft portion as well as on the corresponding bushing.

BRIEF DESCRIPTION OF THE DRAWINGS

The invention will now be described in further detail with reference to the accompanying drawings in which.

DETAILED DESCRIPTION OF THE DRAWINGS

Figure 1:
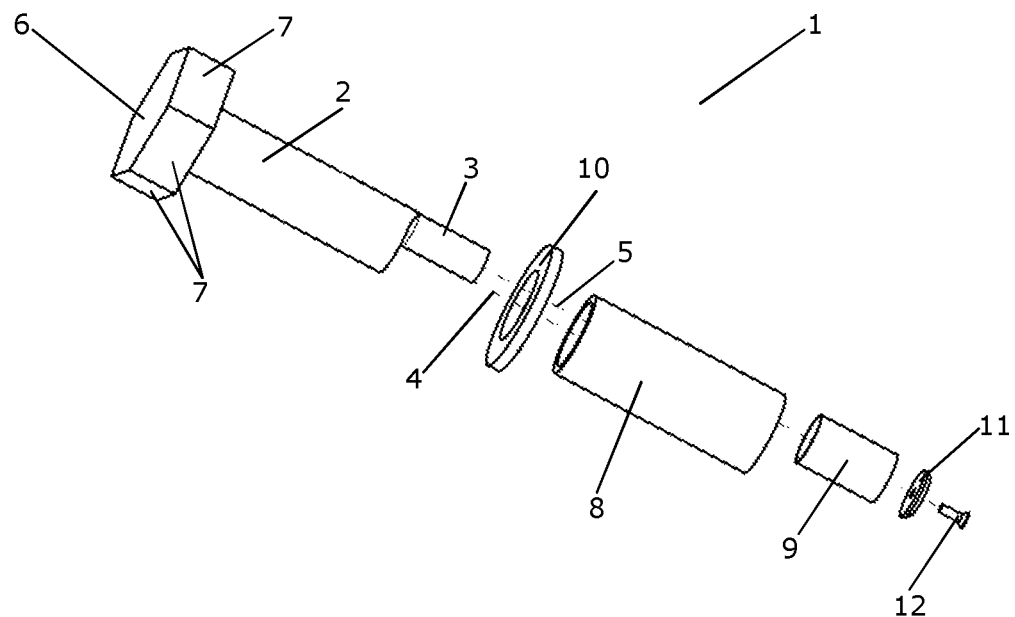
FIG. 1 is an exploded view of an alignment tool according to an embodiment of the invention.

FIG. 1 is an exploded view of an alignment tool 1 according to an embodiment of the invention. The alignment tool 1 comprises a first shaft portion 2 and a second shaft portion 3 extending from an end part of the first shaft portion 2. The first shaft portion 2 and the second shaft portion 3 both have a cylindrical shape, the first shaft portion 2 defining a first cylinder axis 4 and a first surface, and the second shaft portion 3 defining a second cylinder axis 5 and a second surface. A part of the second surface forms a continuation of a part of the first surface, thereby providing a smooth transition between the first shaft portion 2 and the second shaft portion 3 in this region.

The second shaft portion 3 has a diameter which is smaller than a diameter of the first shaft portion 2, and the second cylinder axis 5 extends in parallel to and displaced relative to the first cylinder axis 4. Accordingly, the second shaft portion 3 is arranged eccentrically with respect to the first shaft portion 2.

A bolt head 6 provided with six tool engaging surfaces 7 is arranged adjacent to the first shaft portion 2, opposite to the second shaft portion 3. An appropriate tool, such as a wrench, can be arranged in contact with the tool engaging surfaces 7, thereby allowing torque transfer from the tool to the alignment tool 1 in order to rotate the alignment tool 1 about the first cylinder axis 4. This will be described in further detail below with reference to FIGS. 3 and 4.

A first bushing 8, having a cylindrical shape, is sized and shaped to be arranged along the first shaft portion 2 in such a manner that the first surface is substantially covered by the first bushing 8. The first bushing 8 is allowed to rotate relative to the first shaft portion 2.

A second bushing 9, having a cylindrical shape, is sized and shaped to be arranged along the second shaft portion 3 in such a manner that the second surface is substantially covered by the second bushing 9. The second bushing 9 is allowed to rotate relative to the second shaft portion 3.

As described above, since the bushings 8, 9 are allowed to rotate relative to the shaft portions 2, 3, the shaft portions 2, 3 may rotate relative to bores in which the shaft portions 2, 3 are arranged, while the bushings 8, 9, forming a contacting interface between the alignment tool 1 and inner surfaces of the bores, remain substantially stationary relative to the bores. Thereby the risk of wear and damage on the inner surfaces of the bores is considerably reduced.

The alignment tool 1 further comprises a washer 10 to be arranged between the bolt head 6 and the first bushing 8, an end plate 11 arranged to abut the second bushing 9, and a screw 12 arranged to keep the alignment tool 1 assembled.

Figure 2:
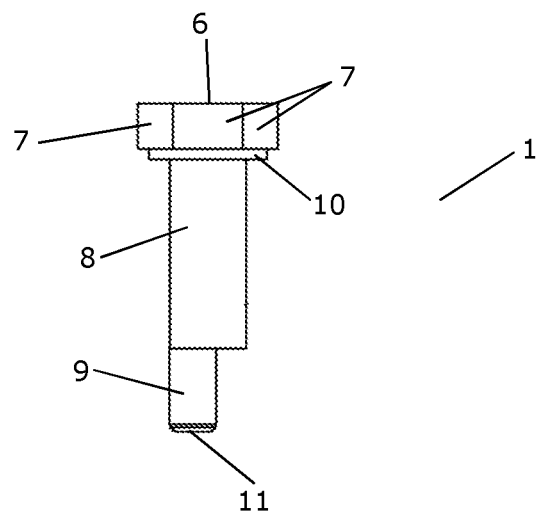
FIG. 2 is a side view of the alignment tool of FIG. 1.

FIG. 2 is a side view of the alignment tool 1 of FIG. 1 in an assembled state. It can be seen that the first bushing 8 is arranged along the first shaft portion (not visible), and the second bushing 9 is arranged along the second shaft portion (not visible).

Figure 3:
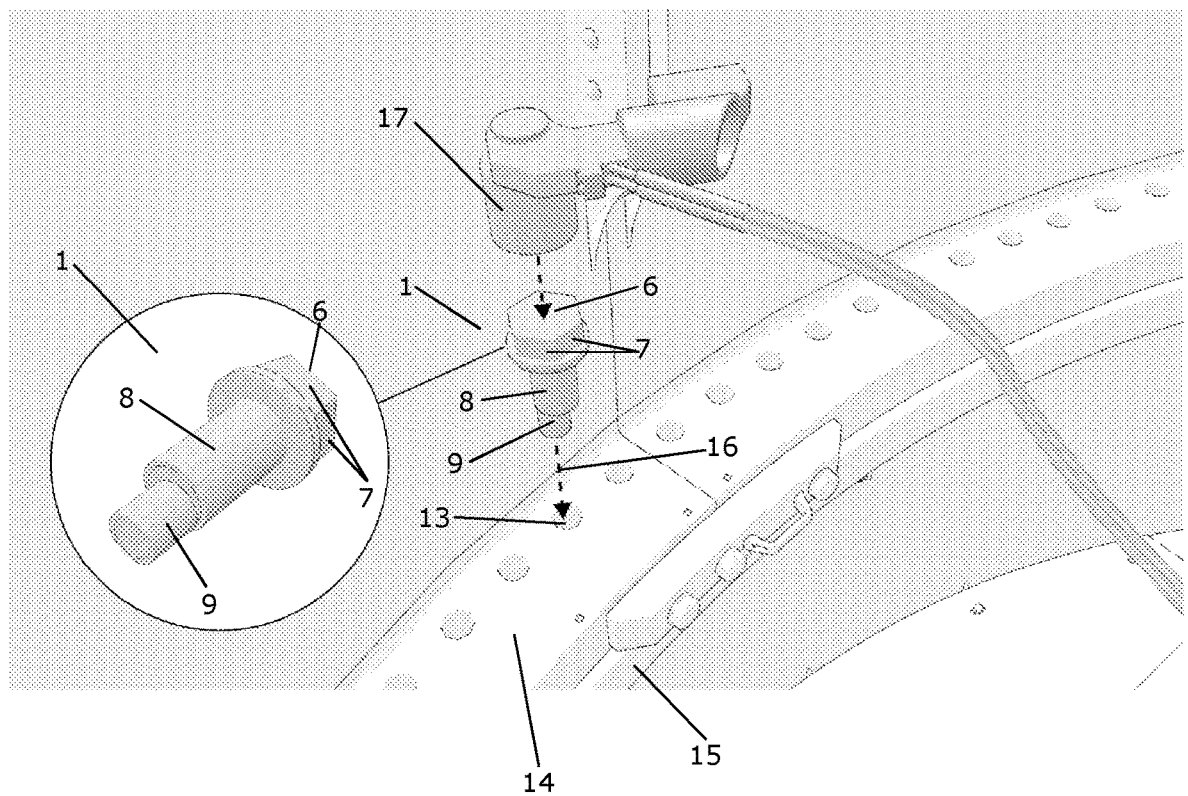
FIG. 3 illustrates insertion of the alignment tool of FIGS. 1 and 2 into a bore.

FIG. 3 illustrates insertion of the alignment tool 1 of FIGS. 1 and 2 into a bore 13. The bore 13 is one of a number of bores being formed in a structural member in the form of a first flange 14 which is to be joined to another structural member in the form of a second flange 15. The second flange 15 is also provided with a number of bores. The insert is a perspective view of the alignment tool 1.

The alignment tool 1 is inserted into the bore 13 along the direction indicated by arrow 16. Subsequently rotating tool 17 can be mounted on the bolt head 6 of the alignment tool 1, in engagement with the tool engaging surfaces 7, in order to rotate the alignment tool 1 about the first cylinder axis (illustrated in FIG. 1), thereby causing alignment of the bore 13 and a corresponding bore formed in the second flange 15, in the manner described above.

Figure 4:
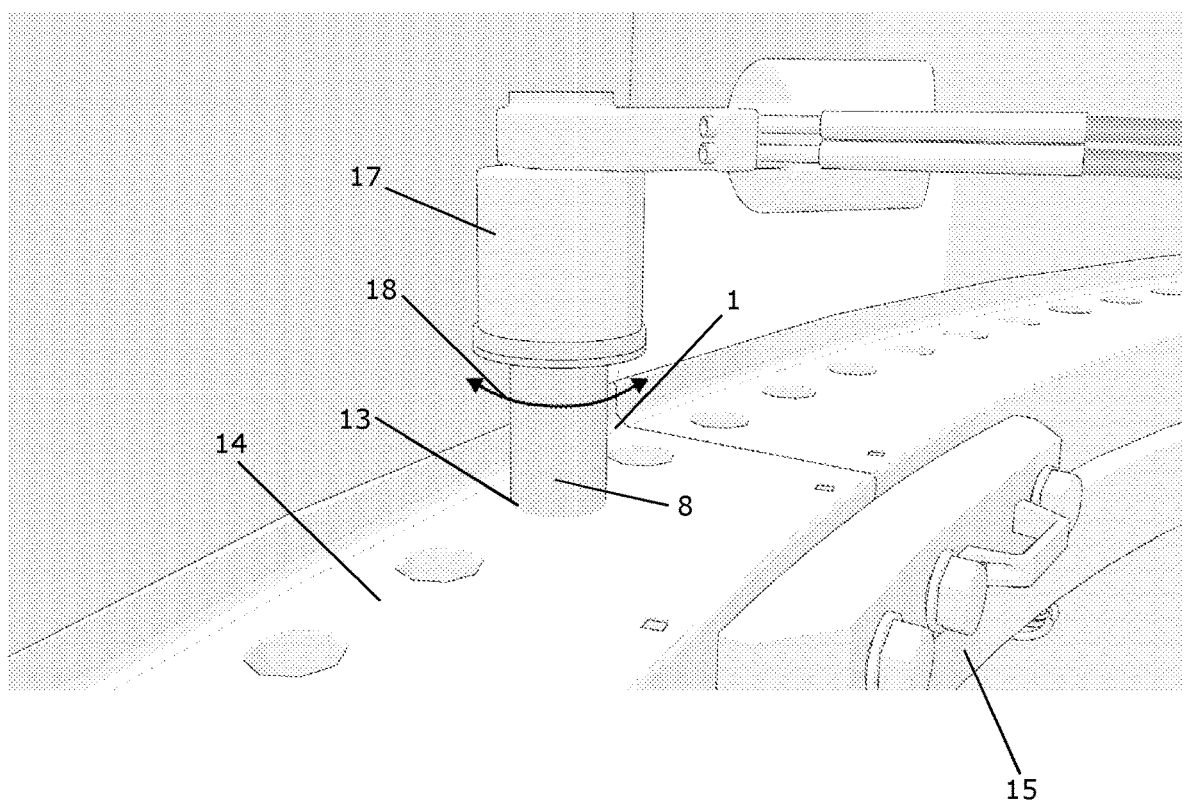
FIG. 4 illustrates rotation of the alignment tool of FIGS. 1 and 2.

FIG. 4 illustrates rotation of the alignment tool 1 of FIGS. 1 and 2 by means of the rotating tool 17. It can be seen that the alignment tool 1 has been inserted into the bore 13, and the rotating tool 17 has been mounted on the bolt head (not visible) of the alignment tool 1. The rotating tool 17 is then activated, causing a rotation of the alignment tool 1 as illustrated by arrow 18. Thereby the bore 13 is aligned with the corresponding bore formed in the second flange 15, in the manner described above.

Figure 5:
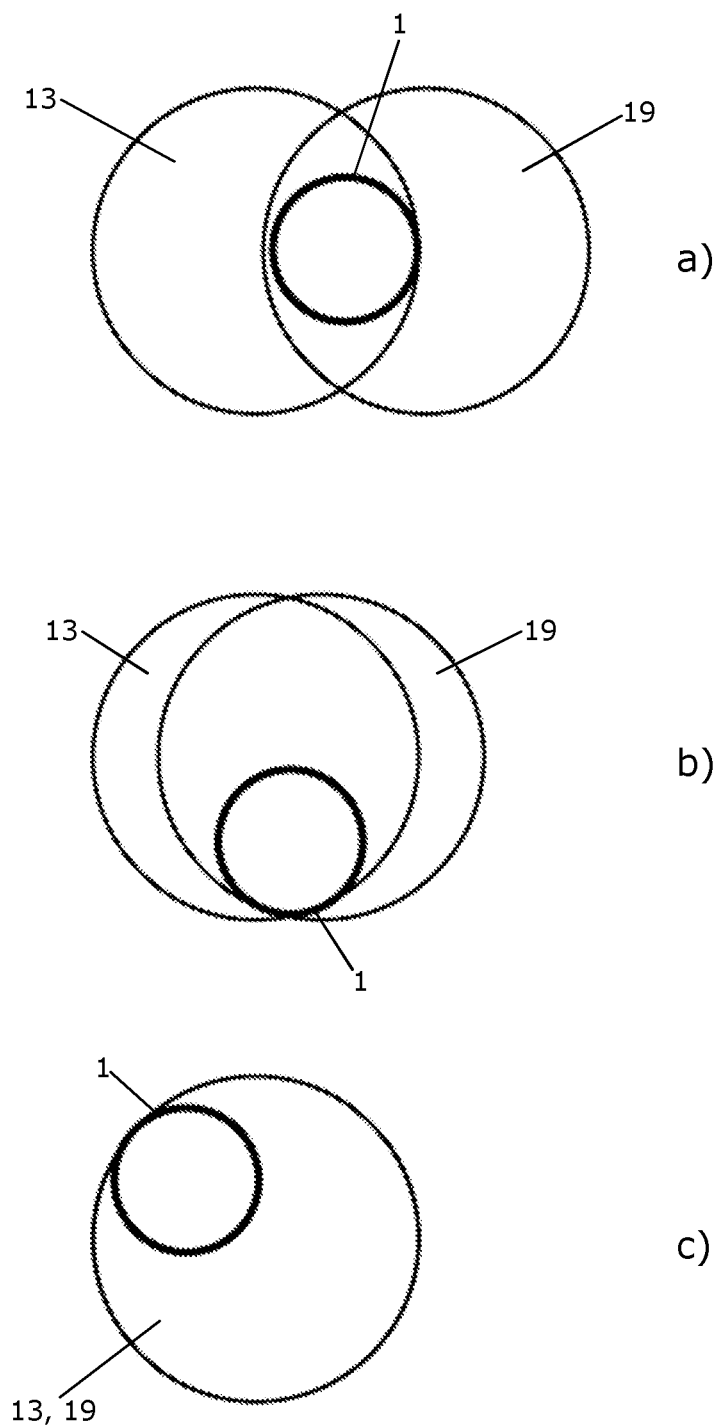
FIG. 5 illustrates operation of an alignment tool according to an embodiment of the invention.

FIG. 5 illustrates operation of an alignment tool 1 according to an embodiment of the invention. FIG. 5a illustrates an initial situation in which a first bore 13, formed in a first structural member, and a second bore 19, formed in a second structural member, are misaligned. An alignment tool 1 according to an embodiment of the invention is inserted into the bores 13, 19 in such a manner that the first shaft portion and the first bushing are arranged in the first bore 13, and the second shaft portion and the second bushing are arranged in the second bore 19.

In FIG. 5b the alignment tool 1 has been rotated about the cylinder axis of the first shaft member. This has caused the second bore 19 to be moved towards alignment with the first bore 13, in the manner described above. However, the bores 13, 19 are not yet completely aligned.

In FIG. 5c the alignment tool 1 has been rotated further about the first cylinder axis. This has caused the second bore 19 to be moved into a position in which it is aligned with the first bore 13.

Since the alignment tool 1 is provided with the first and second bushings, the alignment of the bores 13, 19 illustrated in FIG. 5 can be performed without risking damage or excessive wear on the inner surfaces of the bores 13, 19, because the bushings substantially prevent friction and grinding between the alignment tool 1 and the inner surfaces of the bores 13, 19.

The invention claimed is:

1. An alignment tool for aligning a bore extending through a first structural member with a bore extending through a second structural member, the alignment tool comprising:
    a first shaft portion defining a first axis, a first diameter and a first surface,
    a second shaft portion defining a second axis, a second diameter and a second surface, the second shaft portion being arranged adjacent to the first shaft portion along a direction defined by the first axis, the second axis extending in parallel to the first axis, the second diameter being smaller than the first diameter, and a portion of the second surface forming a continuation of a portion of the first surface,
    a first bushing arranged along the first shaft portion and covering at least a portion of the first surface, and
    a second bushing carried by and arranged along the second shaft portion and covering at least a portion of the second surface,
    wherein mutual rotational movements are allowed between the first shaft portion and the first bushing and between the second shaft portion and the second bushing.

2. The alignment tool according to claim 1, wherein at least one of the first bushing and the second bushing has a cylindrical shape.

3. The alignment tool according to claim 2, wherein the first bushing has a diameter which is larger than a diameter of the second bushing.

4. The alignment tool according to claim 1, further comprising a tool engaging portion arranged to engage a tool for rotating the alignment tool about the first axis.

5. The alignment tool according to claim 4, wherein the tool engaging portion is or forms part of a head part of the alignment tool.

6. The alignment tool according to claim 1, wherein the second shaft portion has a tapered shape along a direction defined by the second axis and in a region arranged opposite to the portion of the second surface which forms an extension of the portion of the first surface.

7. The alignment tool according to claim 1, wherein at least one of the first bushing and the second bushing comprises an outer surface facing a respective at least one of the first structural member and the second structural member, the outer surface being composed of a copper-lead alloy, a plastic, a babbitt alloy or a bronze alloy and configured to operate as a journal bearing.

8. The alignment tool according to claim 1, wherein at least one of the first bushing and the second bushing comprises an inner surface facing a respective at least one of the first shaft portion and the second shaft portion, the inner surface being composed of a copper-lead alloy, a plastic, a babbitt alloy or a bronze alloy and configured to operate as a journal bearing.

9. The alignment tool according to claim 1, wherein at least one of the first shaft portion and the second shaft portion comprises an outer surface facing a respective at least one of the first bushing and the second bushing, the outer surface being composed of a copper-lead alloy, a plastic, a babbitt alloy or a bronze alloy and configured to operate as a journal bearing.

10. The alignment tool according to claim 1, wherein the second bushing includes an opening having a diameter that corresponds to the second diameter of the second shaft portion.

11. The alignment tool according to claim 1, wherein the second bushing is sized such that a gap is formed between an outer surface of the second bushing and a peripheral wall of the bore extending through the second structural member for at least a portion of the peripheral wall.

* * * * *